US007318229B1

(12) United States Patent
Connor et al.

(10) Patent No.: US 7,318,229 B1
(45) Date of Patent: Jan. 8, 2008

(54) METHOD, SYSTEM, AND PROGRAM FOR DISPATCHING A METHOD CALL

(75) Inventors: William H. Connor, Boulder, CO (US); Brandon E. Taylor, Longmont, CO (US)

(73) Assignee: Sun Microsystems, Inc., Menlo Park, CA (US)

( * ) Notice: Subject to any disclaimer, the term of this patent is extended or adjusted under 35 U.S.C. 154(b) by 833 days.

(21) Appl. No.: 10/630,485

(22) Filed: Jul. 29, 2003

(51) Int. Cl.
*G06F 3/00* (2006.01)
*G06F 9/44* (2006.01)
*G06F 9/46* (2006.01)
*G06F 13/00* (2006.01)

(52) U.S. Cl. .................. 719/330; 719/315; 719/316; 714/25; 714/38

(58) Field of Classification Search ............. 719/330, 719/315, 316; 714/25, 38
See application file for complete search history.

(56) References Cited

U.S. PATENT DOCUMENTS 5,832,219 A * 11/1998 Pettus ........................ 709/203
6,260,078 B1 * 7/2001 Fowlow ...................... 719/332
2002/0124244 A1 * 9/2002 Skaringer et al. ........... 717/171

OTHER PUBLICATIONS

Geary, D., "Take Control with the Proxy Design Pattern", [online], Feb. 22, 2002, [Retrieved on Oct. 2, 2003]. Retrieved from the Internet at <URL: http://www.javaworld.com/javaworld/jw-02-2002/jw-0222-designpatterns_p.html>.
HILLSIDE.NET, "Patterns Home Page", [online], © 2002 Hillside. net, [Retrieved on Oct. 2, 2003]. Retrieved from the Internet at <URL: http://hillside.net/patterns/>.
Kalyanaraman, S., "JINI-RMI", [online], [Retrieved on Apr. 13, 2003]. Retrieved from the Internet at <URL: http://www.cse.ucsc.edu/~shankari/jiniwriteup/jinirmi.html>.
Liang, S. and G. Bracha, "Dynamic Class Loading in the Java™ Virtual Machine", *13th Annual ACM SIGPLAN Conference on Object-Oriented Programming Systems, Languages, and Applications (OOPSLA '98)*, 1998, pp. 1-9.
Qian, Z., A. Goldberg, and A. Coglio. "A Formal Specification of Java™ Class Loading", Jul. 21, 2000, pp. 1-47.

(Continued)

*Primary Examiner*—Quynh H. Nguyen
(74) *Attorney, Agent, or Firm*—Finnegan, Henderson, Farabow, Garrett & Dunner, L.L.P.

(57) ABSTRACT

Provided are a method, system, and program for processing a call. A call is invoked from a caller object to a target object, wherein the caller and target objects comprise component objects loaded with caller and target class loaders, respectively, and wherein the caller object invokes the call using a local method invocation. The classes needed to process the call are loaded if the needed classes are not already loaded and if the target class loader is capable of loading the needed classes. Further classes that comprise the needed classes are dynamically loaded if the target class loader is not capable of loading the needed classes. The call is invoked after the needed classes are loaded and available for the target object to process the call.

36 Claims, 6 Drawing Sheets

OTHER PUBLICATIONS

Sun Microsystems, Inc., "Dynamic Proxy Classes", [online], © 1999 Sun Microsystems, Inc., [Retrieved on Oct. 2, 2002]. Retrieved from the Internet at <URL: http://java.sun.com/j2se/1.3/docs/guide/reflection/proxy.html>.

Sun Microsystems, Inc., "Interface Registry (Java 2 Platform Std. Ed. v1.4.1", [online], © 2002 Sun Microsystems, Inc., [Retrieved on Oct. 2, 2002]. Retrieved from the Internet at <URL: http://java.sun.com/j2se/1.4.1/docs/api/java/rmi/registry/Registry.html>.

Sun Microsystems, Inc., "Java Remote Method Invocation: 3- RMI System Overview", [online], © 2001 Sun Microsystems, Inc., [Retrieved on Apr. 14, 2003]. Retrieved from the Internet at <URL: http://lamscours-java.epfl.ch/2002/docs/guid/rmi/spec/rmi-arch5.html>.

Sun Microsystems, Inc., "Jini(™) Technology 1.0 API Documentation: Interface ServiceRegistrar", [online], © 1999 Sun Microsystems, Inc., [Retrieved on Oct. 2, 2002]. Retrieved from the Internet at <URL: http://java.sun.com/products/jini/1.0/docs/api/net/jini/core/lookup/ServiceRegistrar.html>.

Sun Microsystems, Inc., "Local, Remote, and Web Service Client Views", *Enterprise JavaBeans 2.1*, Proposed Final Draft, Chapter 5, Aug. 2, 2002, pp. 53-58.

The Middleware Company, "Java RMI", © 2002 The Middleware Company, pp. 1-36.

Tozawa, A. and M. Hagiya, "Formalization of Class Loading in Java", Jun. 9, 1999, pp. 1-33.

Venners, B., "Method Invocation and Return", [online], Feb. 18, 2003, [Retrieved on Feb. 23, 2003]. Retrieved from the Internet at <URL: http://www.artima.com/underthehood/invocationP.html>.

\* cited by examiner

METHOD, SYSTEM, AND PROGRAM FOR DISPATCHING A METHOD CALL

BACKGROUND OF THE INVENTION

1. Field of the Invention

The present invention relates to a method, system, and program for dispatching a method call.

2. Description of the Related Art

In the Java** runtime environment, which is implemented by a Java Virtual Machine ("JVM"), software components may be dynamically loaded by one or more class loaders. In Java, a software component is represented by one or more classes executed by the JVM. A class loader method takes a class name as an argument when called and returns a class object that is a runtime representation of the class. Certain class loaders may be used to load classes associated with facilities and components that are intended to be shared among different classes and certain other class loaders may be used to load application specific or other user-defined classes that are not shared.

**Sun Microsystems and Java are trademarks of Sun Microsystems, Inc.

A component object can call another object using a local reference. The receiving object will attempt to process the call. A problem may arise if the calling and receiving objects were instantiated from classes loaded by different class loaders, and the call invoked by the calling object has parameters and/or return values with types loaded by the class loaders. In such case, an exception could be thrown if the receiving object attempts to recognize the type loaded in the caller's class loader as the type loaded in the receiver's class loader. This is because the types have different runtime identities. In Java, the runtime identity of a type is defined by the class name of the type and the class loader that loaded the type.

The Remote Method Invocation (RMI) protocol may be used to avoid the problem of a class mismatch. In RMI, when the calling object calls the method on the receiving object, any parameter serialized as a result of the call is annotated with the codebase associated with the parameter. The codebase is a set of Universal Resource Locators (URLs) from where the class files for the annotated objects can be located. According to the RMI protocol, the receiving object, upon receiving the method invocation, will use the codebase in the annotation to load the class if the class cannot be loaded by the receiving object's class loader or, if the receiving object's class loader can load a class having the same name, the receiving object would use such loaded class. Thus, with RMI, an exception is not thrown if there is a class mismatch, because, according to the RMI protocol, the receiving object will use the class, having the same name, loaded by the receiving object's class loader.

SUMMARY OF THE EMBODIMENTS

Provided are a method, system, and program. A call is invoked from a caller object to a target object, wherein the caller and target objects comprise component objects loaded with call and target class loaders, respectively, and wherein the caller object invokes the call using a local method invocation. The classes needed to process the call are loaded if the needed classes are not already loaded and if the target class loader is capable of loading the needed classes. Further classes that comprise the needed classes are dynamically loaded if the target class loader is not capable of loading the needed classes. The call is invoked after the needed classes are loaded and available for the target object to process the call.

In further implementations, loading the needed classes further comprises using a codebase annotated to at least one object referenced in the call to access and load the needed classes.

Yet further, a return value is received in response to invoking the call on the target object and the needed classes to process the return value are loaded if the needed classes to process the return value are not already loaded and if the caller class loader is capable of loading the needed classes to process the return value. Further, classes comprising the needed classes to process the return value are dynamically loaded if the caller class loader is not capable of loading the needed classes.

In still further implementations, the steps of loading the needed classes are performed by a virtual machine. An invocation handler marshalls and unmarshalls of parameters of the method. The invocation handler further marshalls and unmarshalls of a return value returned in response to invoking the call on the target object to load the classes needed to process the return value from the caller class loader or, if the caller class loader cannot load the needed classes, to dynamically load the classes.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
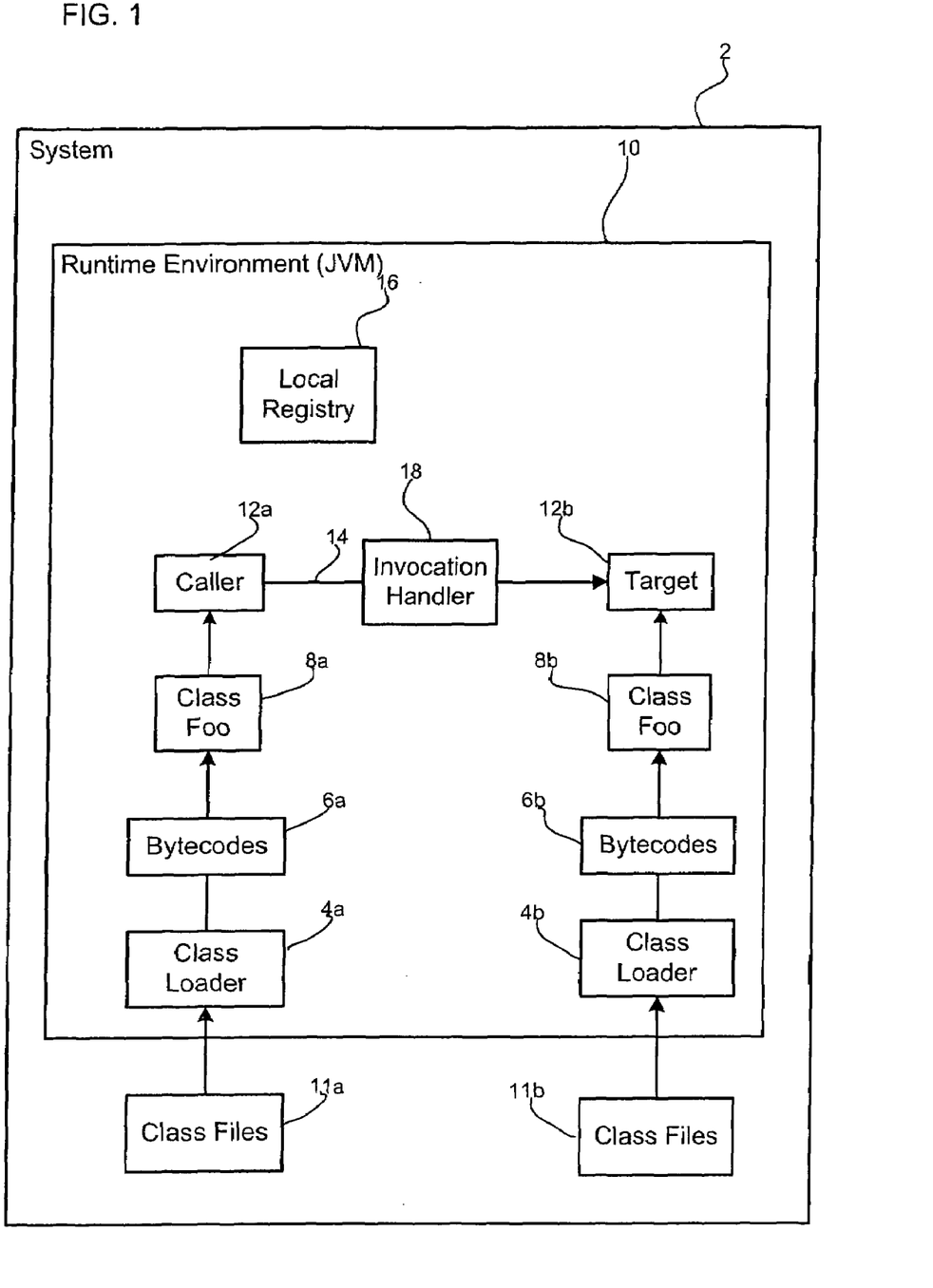
FIG. 1 illustrates a computing environment in accordance with certain implementations of the invention.

FIG. 1 illustrates a computing environment in which aspects of the invention are implemented. A system 2 includes a plurality of class loaders 4a, 4b that load bytecodes 6a, 6b implementing classes 8a, 8b into a runtime environment 10, such as the Java** runtime environment, from class files 11a, 11b in the system 2. The class loaders 4a, 4b also run in the runtime environment 10. In FIG. 1, the classes 8a, 8b loaded both have the same name "Foo". Additional classes having different class names may be loaded by the class loaders 4a, 4b. Component objects, referred to as caller 12a and target 12b, are accessible using methods from classes 8a, 8b, respectively. The classes 8a, 8b are loaded into the runtime environment by class loaders 4a, 4b. FIG. 1 illustrates caller 12a invoking a method "call" 14, which is called on target 12b, wherein the invoked method 14 is declared by an interface of the target 12b and an instance of class Foo 8b is a parameter passed to that method 14. The classes 8a and 8b may represent the class associated with the parameter of the call made between the caller 12a and target 12b.

**Sun Microsystems and Java are trademarks of Sun Microsystems, Inc.

Component objects, such as the caller 12a and target 12b, may register themselves with a local registry 16, although it is not necessary that the caller 12a be registered. The local registry 16 maintains a reference for each registered object. The caller 12a may use the registry to retrieve a reference to the target 12b prior to invoking the call on the target object 12b. An invocation handler 18 performs the operations to dispatch the method 14, and performs the marshalling and unmarshalling operations to prepare parameters and return values for transport between the objects 12a, 12b. The marshalling process ensures that the appropriate codebase is annotated to any object parameters of the call so that the classes associated with the object in the call can be retrieved if necessary from the location specified in the codebase. The marshalling and unmarshalling operations are used to ensure that all classes needed for the target object to process the call and for the caller object to process a return value can be loaded into the target and caller class spaces, respectively. The unmarshalling process first attempts to resolve classes by name in the local class loading context. For the parameters of the call, the unmarshalling process will attempt to resolve the name in the local class loading context of the target and for the return value, the unmarshalling process will attempt to resolve the name in the local class loading context of the caller. If the needed classes cannot be loaded in the local class loading context, then they are loaded dynamically using the codebase annotated to the parameters or the return value.

FIG. 1 provides an illustration of how an object 12a, the caller, may call another object 12b, the target. There may be additional objects instantiated from additional classes. Further, object 12b may invoke a method on object 12a. Yet further, there may be additional class loaders 4a, 4b, that may be at the same or different levels in the class loader hierarchy. A loader hierarchy indicates a hierarchy of class loaders to be employed in loading class files. This hierarchy may comprise a delegation relationship between class loaders. Each instance of a class loader has an associated parent class loader. When called upon to find a class or resource, a class loader instance will delegate the search for the class or resource to its parent class loader before attempting to find the class or resource itself.

Figure 2:
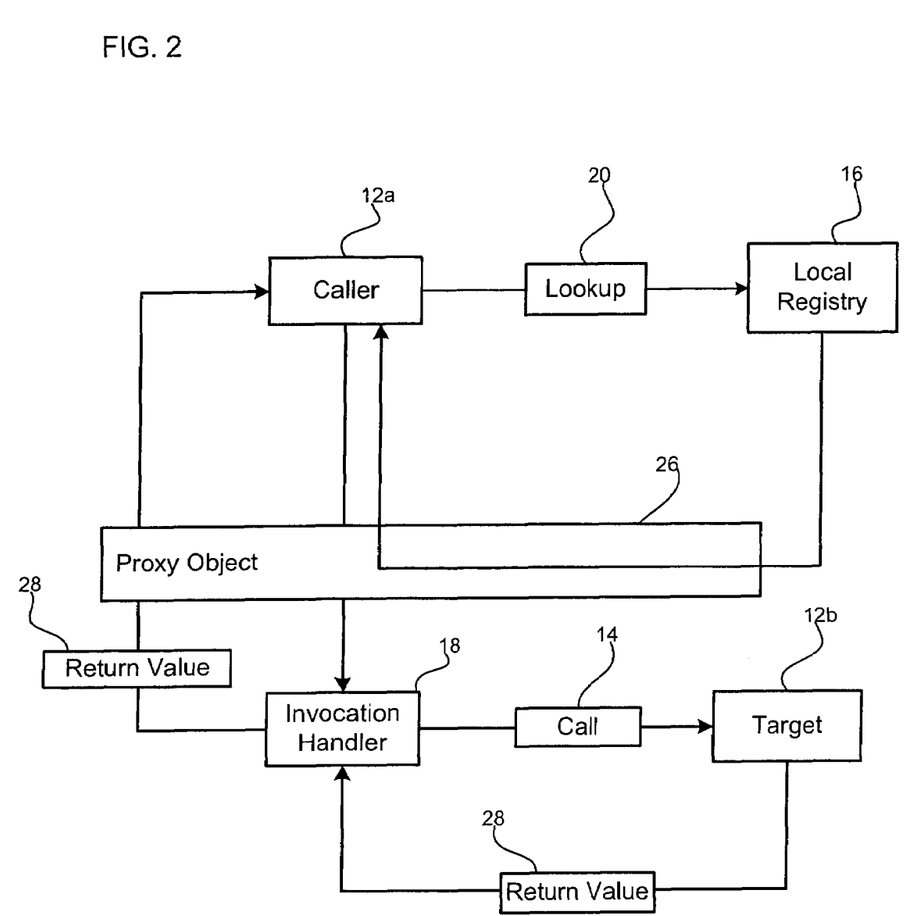
FIG. 2 illustrates a interaction between components in accordance with certain implementations of the invention.

FIG. 2 illustrates the flow of operations among program components that occurs when the caller 12a makes a call 14 on target object 12b. The caller 12a would invoke a method call 14 that would have zero or more objects as parameters. To invoke the call 14, the caller 12a first must obtain a reference to the target 12b. To do this, the caller 12a would make a lookup call 20 to the local registry 16. The local registry 16 would create a dynamic proxy 26 that wraps a reference to the target object and a reference to an invocation handler 18, which has references to the target 12b, the target's class loader 4b, and the caller's class loader 4a. The caller 12a then receives the dynamic proxy 26 and invokes the call 14 on the dynamic proxy 26 as if the dynamic proxy 26 is the target 12b itself. In response, the proxy object 26 invokes the invocation handler 18, which makes the call 14 on the target 12b, and returns any return values 28 to the invocation handler 18, which returns the values to the proxy object 26, which in turn returns them to the caller 12a.

Figure 3:
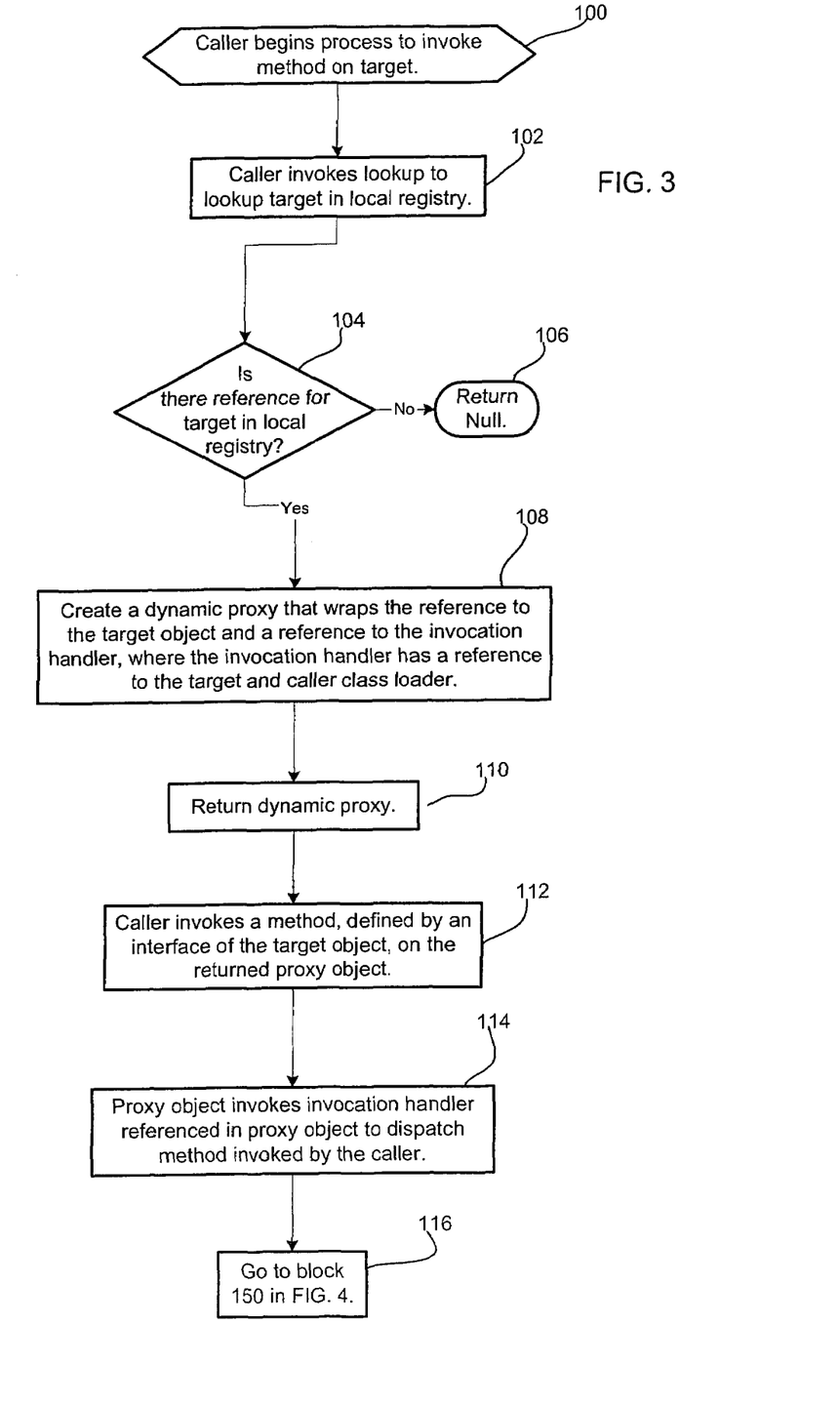
FIGS. 3, 4, and 5 illustrate operations performed to implement a local method invocation in accordance with implementations of the invention.
Figure 4:
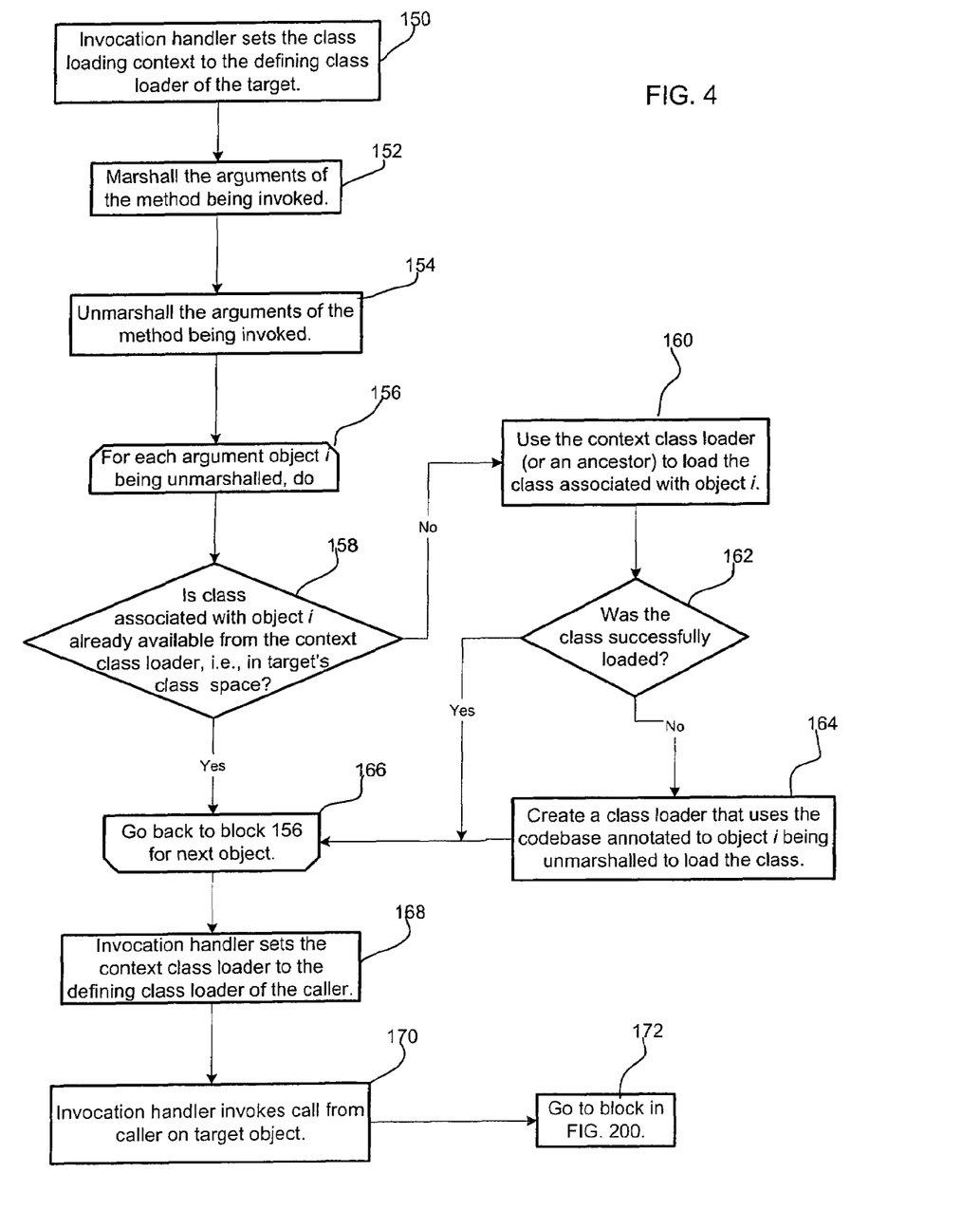
Figure 5:
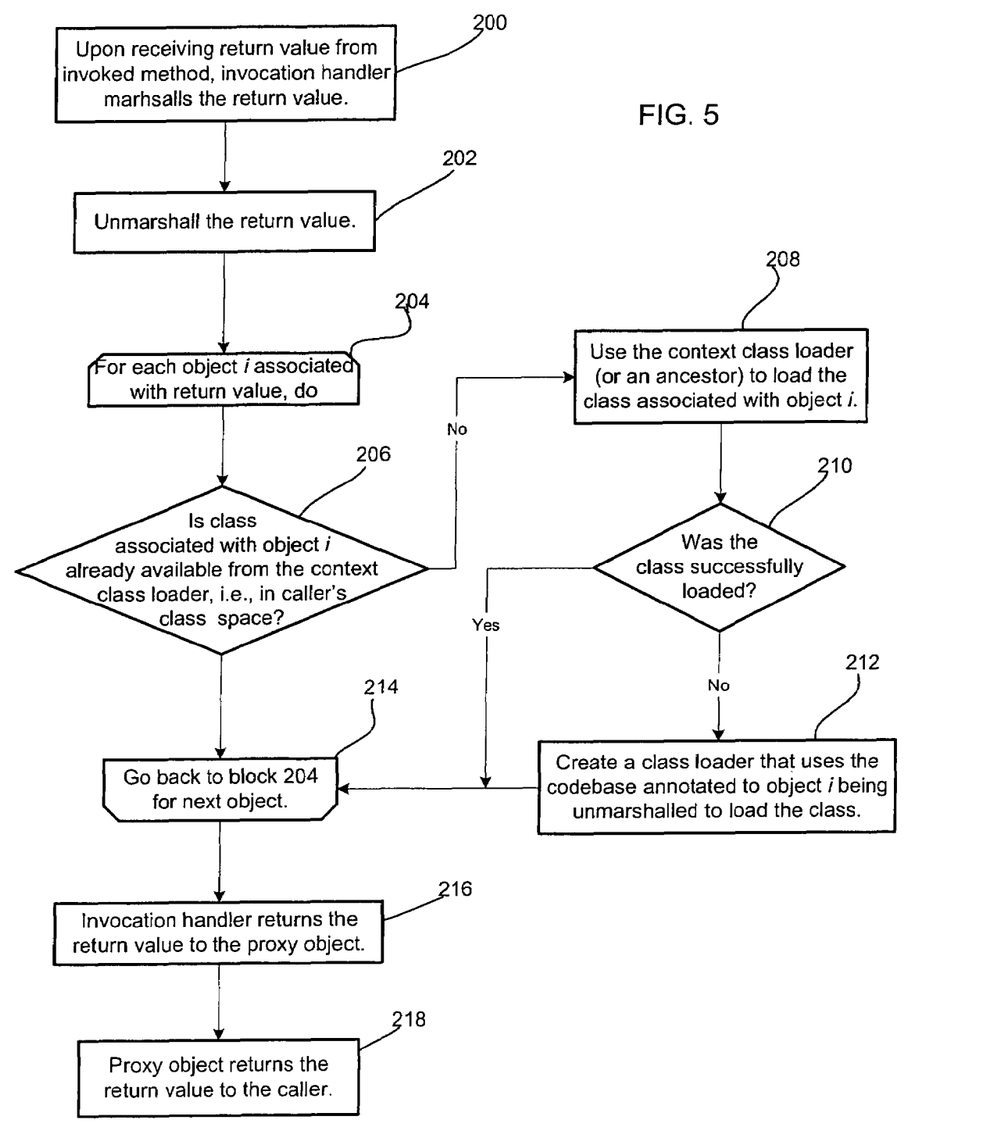

FIGS. 3, 4, and 5 illustrate operations performed by the components shown in FIGS. 1 and 2 to dispatch a call 14 invoked by caller 12a on target 12b. With respect to FIG. 3, at block 100, the caller 12a begins the process to invoke the call 14 on target 12b. Using a local method invocation, the caller 12a invokes (at block 102) a lookup call 20 on the local registry 16 to locate the reference to the target 12b. If (at block 104) there is no reference to the target 12b, then the local registry 16 returns (at block 106) NULL. Otherwise, if there is a reference to the target 12b, then the local registry 16 creates (at block 108) a dynamic proxy 26 that wraps the reference to the target object 12b and a reference to the invocation handler 18, where the invocation handler 18 has a reference to the target 12b, the target class loader 4b, and the caller class loader 4a. The local registry 16 then returns (at block 110) the proxy 26 to the caller 12a and the caller 12a invokes (at block 112) the call 14, which is declared by an interface of the target 12b, on the returned proxy 26. The proxy object 26 then invokes (at block 114) the invocation handler 24 referenced in the proxy 22 to dispatch the call 14 invoked by the caller 12a.

Control then proceeds (at block 116) to block 150 in FIG. 4, where the invocation handler 18 sets the class loading context to the defining class loader 4b of the target 12b. This will allow the invocation handler to first attempt to resolve the classes for the objects referenced as parameters in the call 14 from the target's local class loading context. The invocation handler 18 then marshalls (at block 152) the parameters of the call 14 being invoked and unmarshalls (at block 154) the arguments of the call 14 by performing the steps at blocks 156-166. For each object i that is a parameter of the call 14, a loop is performed at blocks 158-164. If (at block 158) the class associated with object i is not already available from the target 12b context class loader 4b, i.e., in target's 12b class space, then the runtime environment (e.g., JVM or other virtual machine) 10 uses (at block 160) the target context class loader (or an ancestor thereof) to load the class associated with object i. If (at block 162) the class was not successfully loaded, then the runtime environment 10 creates (at block 164) a class loader having the target's 12b initiating class loader as the parent that uses the codebase annotated to object being unmarshalled in order to load the class associated with object i. Once the class needed for object i is loaded, control proceeds (at block 166) to consider any further objects included as parameters of the call 14.

After all the classes needed to process the zero or more objects referenced as parameters in the call 14 are loaded, the invocation handler 18 sets (at block 168) the context class loader to the defining class loader 4a of the caller and invokes (at block 170) the call 14 on the target 12b object. The context class loader is set back to the defining class loader 4a of the caller to allow the invocation handler 18 to first attempt to resolve the class for the objects included in the return value 28 from the caller's local class loading context 4a. Control then proceeds (at block 172) to block 200 in FIG. 5 where the invocation handler 18 receives the return value 28 from the invoked call 14 and then marshalls (at block 200) and unmarshalls (at block 202) the return value 28. The invocation handler 18 unmarshalls the return value 28 by performing a loop at steps 204 through 214 for each object i associated with the return value, where each object may need a separate class loaded to process the return value object i. If (at block 206) the class associated with object i is not already available from the caller context class loader 4a, i.e., in the caller's 12a class space, then the runtime environment 10 uses (at block 208) the context class loader (or an ancestor) to load the class associated with object i. If (at block 210) the caller context class loader (or one of the ancestors in the class loader hierarchy) could not load the class associated with object i in the return value 28, then the runtime environment 10 creates (at block 212) a class loader having the caller's 12a initiating class loader as the parent that uses the codebase annotated to object being unmarshalled in order to load the class 8b associated with object i. Once the class needed for object i is loaded, control proceeds (at block 214) to consider any further objects included in the return value 28.

The invocation handler 18 then returns (at block 216) the return value 28 to the proxy object 26. The proxy object 26 then returns (at block 218) the return value 28 to the caller 12a to process using the zero or more classes, some of which may have been loaded using the annotated codebase.

The described implementations provide a technique to allow component objects instantiated from classes loaded by different class loaders to invoke local calls on one another in a manner that avoids the class identity conflict without having to implement the entire RMI protocol, which potentially involves the use of network sockets. With the described implementations, an invocation handler manages the invocation of the call and the return of any return values by performing the marshalling and unmarshalling operations to ensure that the necessary classes are loaded appropriately in the target and caller class spaces to process the call and any return values.

Described implementations provide advantages over using the RMI protocol to circumvent the class mismatch problem described above. The described implementations are less computationally expensive than the RMI protocol. Further described implementations, which use local calls, provide additional security over the RMI Protocol, which uses network sockets that provide openings for malicious users. Finally, the described implementations do not result in a loss of contextual information since caller and receiver do not share a thread of execution.

The above described method, apparatus or article of manufacture for handling method calls may use standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which described implementations are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The described implementations utilized the Java programming language and the Java RMI communication protocol. Alternatively, the implementations may utilize other object oriented programming languages, such as C++, Smalltalk, etc. Further, the interface between the client and server may utilize alternative communication protocols to handle the remote calls, such as SOAP, Common Object Request Broker Architecture (CORBA), Remote Procedure Call (RPC), Distributed Relational Database Architecture (DRDA), etc. In implementations using alternative communication protocols for the remote communications, the client and server would implement the communication specific related methods.

In certain described implementations, the JVM 10 is used to load classes from Java classfiles. In alternative implementations, the loader technique described herein may be used to load classes from any type of file or object available for download, not just archive files or classfiles, and for object oriented programming environments other than Java.

FIGS. 3, 4, and 5 illustrate specific operations occurring in a particular order. In alternative implementations, certain of the logic operations may be performed in a different order, modified or removed and still implement the present invention. Moreover, steps may be added to the above described logic and still conform to the described implementations. Further, operations described herein may occur sequentially or certain operations may be processed in parallel. Yet further, operations described herein may be performed by a single process and/or processing unit or distributed among a plurality of processes and/or processing units.

Figure 6:
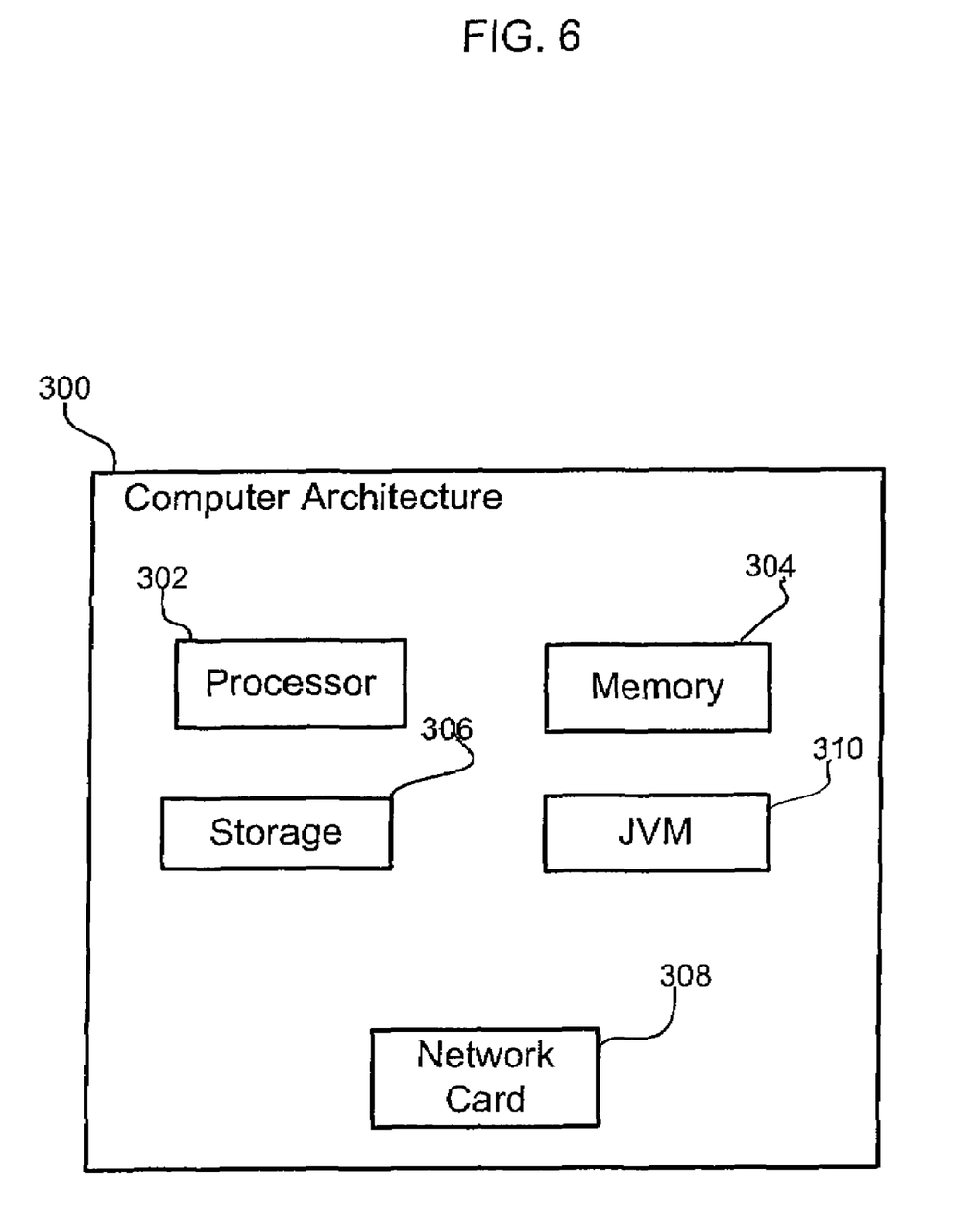
FIG. 6 illustrates a computer architecture in which aspects of the invention may be implemented.

FIG. 6 illustrates one implementation of the system architecture of the system 2 (FIG. 1). The system 2 may implement a computer architecture 300 having a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs in the storage 306 are loaded into the memory 304 and executed by the processor 302 in a manner known in the art. The architecture further includes a network card 308 to enable communication with a network. Further, in certain implementations, the architecture may include a virtual machine program, such as the Java Virtual Machine (JVM) 310.

The foregoing description of various implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

invoking a call from a caller object to a target object, wherein the caller and target objects comprise component objects loaded with a caller and target class loaders, respectively, and wherein the caller object invokes the call using a local method invocation;

loading classes needed to process the call if the needed classes are not already loaded and if the target class loader is capable of loading the needed classes;

dynamically loading classes comprising the needed classes if the target class loader is not capable of loading the needed classes; and invoking the call after the needed classes are loaded and available for the target object to process the call.

2. The method of claim 1, wherein loading the classes further comprises:

using a codebase annotated to at least one object referenced in the call to access and load the needed classes.

3. The method of claim 2, wherein loading the classes further comprises:

creating a class loader having the target class loader as a parent class loader, wherein the created class loader uses the codebase to load the needed classes.

4. The method of claim 1, further comprising:

receiving a return value in response to invoking the call on the target object;

loading needed classes to process the return value if the needed classes to process the return value are not already loaded and if the caller class loader is capable of loading the needed classes to process the return value; and dynamically loading classes comprising the needed classes to process the return value if the caller class loader is not capable of loading the needed classes.

5. The method of claim 4, further comprising:

setting a class loading context to the target class loader before loading classes needed to process the call; and setting the class loading context to the caller class loader before loading classes needed to process the return value.

6. The method of claim 4, wherein loading the target classes needed to process the return value further comprises:

creating a class loader having the caller class loader as a parent class loader; and using, with the created class loader, codebase annotated to at least one object included with the return value to access and load the needed classes to process the return value.

7. The method of claim 1, further comprising:

before invoking the call, performing a lookup operation on a registry to lookup the target object;

if the target object is not referenced in the registry, failing the call; and if the target object is referenced in the registry, then returning a reference to the target object to the caller object.

8. The method of claim 7, wherein returning the reference to the target object further comprises:

returning the reference to the target object wrapped in a proxy object, wherein the caller object causes the invocation of the invocation handler by invoking the returned proxy object.

9. The method of claim 8, wherein the proxy object includes a reference to the invocation handler, further comprising:

invoking, with the proxy object, the invocation handler when the caller object invokes the method on the proxy object.

10. The method of claim 1, wherein the steps of loading the needed classes are performed by a virtual machine, further comprising:

performing, with an invocation handler, marshalling and unmarshalling of parameters of the method; and performing, with the invocation handler, marshalling and unmarshalling of a return value returned in response to invoking the call on the target object to load the classes needed to process the return value from the caller class loader or, if the caller class loader cannot load the needed classes, to dynamically load the classes.

11. The method of claim 10, wherein the invocation handler performs the marshalling and marshalling operations of the Remote Method Invocation (RMI) protocol.

12. The method of claim 1, wherein the call invoked by the calling object is invoked without experiencing a class mismatch problem.

13. A system, comprising:

a runtime environment including a call object, a target object, and a local method invocation, wherein the caller and target objects comprise component objects a caller and target class loaders, respectively;

means for invoking a call from the caller object to the target object using the local method invocation;

means for dynamically loading classes comprising the needed classes if the target class loader is not capable of loading the needed classes; and means for invoking the call after the needed classes are loaded and available for the target object to process the call.

14. The system of claim 13, wherein the means for loading the classes further performs:

using a codebase annotated to at least one object referenced in the call to access and load the needed classes.

15. The system of claim 14, wherein the means for loading the classes further performs:

creating a class loader having the target class loader as a parent class loader, wherein the created class loader uses the codebase to load the needed classes.

16. The system of claim 13, further comprising:

means for receiving a return value in response to invoking the call on the target object;

means for loading needed classes to process the return value if the needed classes to process the return value are not already loaded and if the caller class loader is capable of loading the needed classes to process the return value; and means for dynamically loading classes comprising the needed classes to process the return value if the caller class loader is not capable of loading the needed classes.

17. The system of claim 16, further comprising:

means for setting a class loading context to the target class loader before loading classes needed to process the call; and means for setting the class loading context to the caller class loader before loading classes needed to process the return value.

18. The system of claim 16, wherein the means for loading the target classes to process the return value further performs:

creating a class loader having the caller class loader as a parent class loader; and using, with the created class loader, a codebase annotated to at least one object included with the return value to access and load the needed classes to process the return value.

19. The system of claim 13, further comprising:

means for performing a lookup operation on a registry to lookup the target object before invoking the call;

means for failing the call if the target object is not referenced in the registry; and means for returning a reference to the target object to the caller object if the target object is referenced in the registry.

20. The system of claim 19, wherein the means for returning the reference to the target object further performs:
returning the reference to the target object wrapped in a proxy object, wherein the caller object causes the invocation of the invocation handler by invoking the returned proxy object.

21. The system of claim 20, wherein the proxy object includes a reference to the invocation handler, further comprising:
means for invoking, with the proxy object, the invocation handler when the caller object invokes the method on the proxy object.

22. The system of claim 13, wherein the means for loading the needed classes comprises a virtual machine, wherein the runtime environment includes an invocation handler, further comprising:
means for performing, with the invocation handler, marshalling and unmarshalling of parameters of the method; and
means for performing, with the invocation handler, marshalling and unmarshalling of a return value returned in response to invoking the call on the target object to load the classes needed to process the return value from the caller class loader or, if the caller class loader cannot load the needed classes, to dynamically load the classes.

23. The system of claim 22, wherein the invocation handler performs the marshalling and unmarshalling operations of the Remote Method Invocation (RMI) protocol.

24. The system of claim 13, wherein the call invoked by the calling object is invoked without experiencing a class mismatch problem.

25. A tangible computer-readable medium containing instructions for controlling a data processing system to perform a method, the method comprising:
invoking a call from a caller object to a target object, wherein the caller and target objects comprise component objects loaded with caller and target class loaders, respectively, and wherein the caller object invokes the call using a local method invocation;
loading classes needed to process the call if the needed classes are not already loaded and if the target class loader is capable of loading the needed classes;
dynamically loading classes comprising the needed classes if the target class loader is not capable of loading the needed classes; and
invoking the call after the needed classes are loaded and available for the target object to process the call.

26. The tangible computer-readable medium of claim 25, wherein loading the classes further comprises:
using a codebase annotated to at least one object referenced in the call to access and load the needed classes.

27. The tangible computer-readable medium of claim 26, wherein loading the classes further comprises:
creating a class loader having the target class loader as a parent class loader, wherein the created class loader uses the codebase to load the needed classes.

28. The tangible computer-readable medium of claim 25, wherein the method further comprises:
receiving a return value in response to invoking the call on the target object;
receiving a return value in response to invoking the call on the target object;
loading needed classes to process the return value if the needed classes to process the return value are not already loaded and if the caller class loader is capable of loading the needed classes to process the return value; and
dynamically loading classes comprising the needed classes to process the return value if the caller class loader is not capable of loading the needed classes.

29. The tangible computer-readable medium of claim 28, wherein the method further comprises:
setting a class loading context to the target class loader before loading classes needed to process the call; and
setting the class loading context to the caller class loader before loading classes needed to process the return value.

30. The tangible computer-readable medium of claim 28, wherein loading the target classes needed to process the return value further comprises:
creating a class loader having the caller class loader as a parent class loader; and
using, with the crated class loader, a codebase annotated to at least one object included with the return value to access and load the needed classes to process the return value.

31. The tangible computer-readable medium of claim 25, wherein the method further comprises:
before invoking the call, performing a lookup operations on a registry to lookup the target object;
if the target object is not referenced in the registry, failing the call; and
if the target object is referenced in the registry, then returning a reference to the target object to the caller object.

32. The tangible computer-readable medium of claim 31, wherein returning the reference to the target object further comprises:
returning the reference to the target object wrapped in a proxy object, wherein the caller object causes the invocation of the invocation handler by invoking the returned proxy object.

33. The tangible computer-readable medium of claim 32, wherein the proxy object includes a reference to the invocation handler, wherein the method further comprises:
invoking, with the proxy object, the invocation handler when the caller object invokes the method on the proxy object.

34. The tangible computer-readable medium of claim 25, wherein the steps of loading the needed classes are performed by a virtual machine, wherein the operation method further comprise comprises:
performing, with an invocation handler, marshalling and unmarshalling of parameters of the method; and
performing, with the invocation handler, marshalling and unmarshalling of a return value returned in response to invoking the call on the target object to load the classes needed the process the return value from the caller class loader or, if the caller class loader cannot load the needed classes, to dynamically load the classes.

35. The tangible computer-readable medium of claim 34, wherein the invocation handler performs the marshalling and unmarshalling operations of the Remote Method Invocation (RMI) protocol.

36. The tangible computer-readable medium of claim 25, wherein the call invoked by the calling object is invoked without experiencing a class mismatch problem.

* * * * *